Patented Dec. 13, 1932

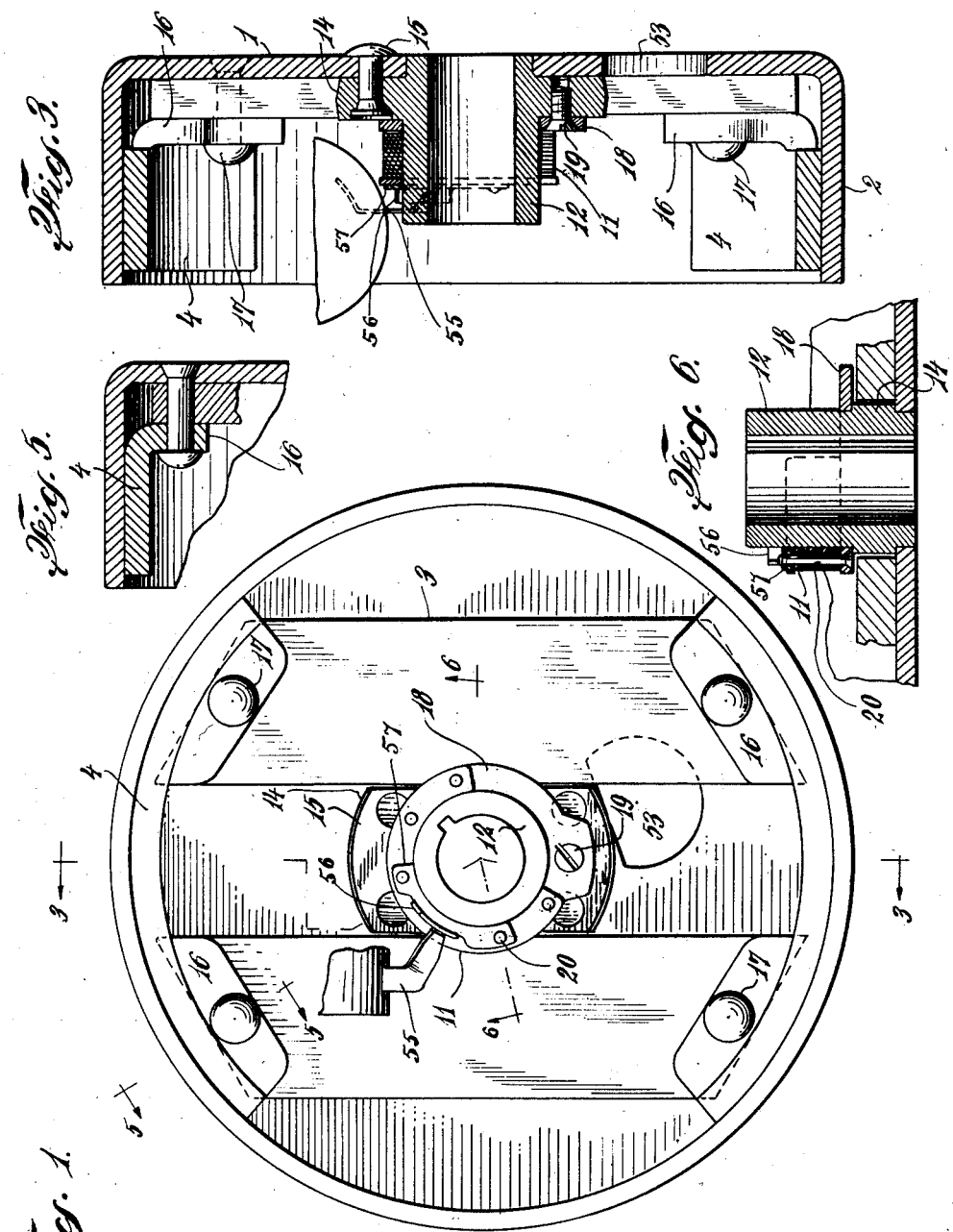

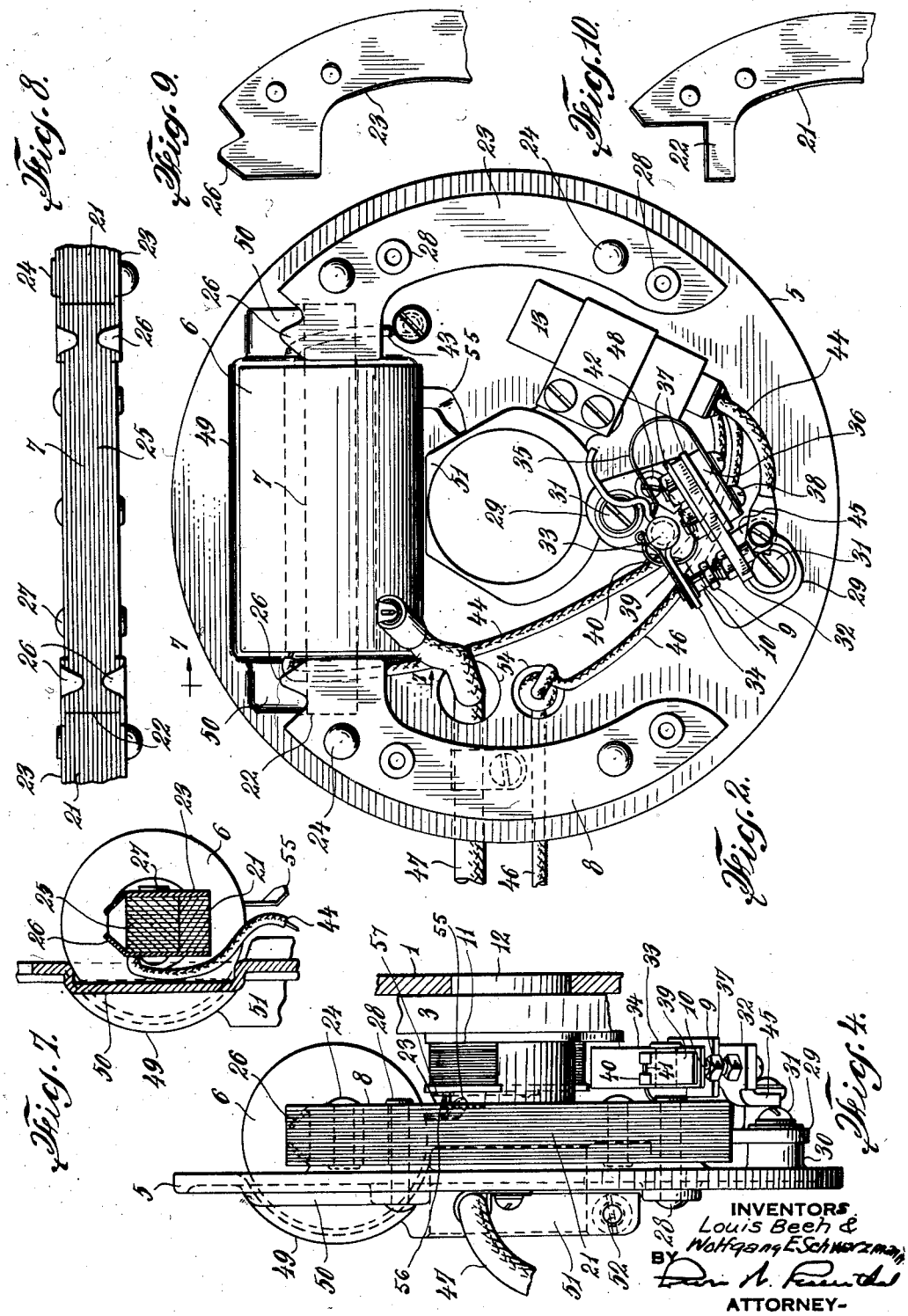

1,890,898

UNITED STATES PATENT OFFICE

LOUIS BEEH AND WOLFGANG E. SCHWARZMANN, OF LONGMEADOW, MASSACHUSETTS, ASSIGNORS TO UNITED AMERICAN BOSCH CORPORATION, OF SPRINGFIELD, MASSACHUSETTS, A CORPORATION OF NEW YORK

FLYWHEEL MAGNETO

Application filed April 23, 1932. Serial No. 607,076.

This invention relates to improvements in electrical magnetos, and particularly magnetos for producing electric current to ignite the fuel charges in the power chamber of internal combustion engines.

An object of the invention is to provide an ignition magneto, part of which can be conveniently mounted upon the flywheel of an internal combustion engine; and which is simple, durable, efficient, light in weight, and of relatively small compass.

Another object of the invention is to provide a magneto of the flywheel type, with permanent magnets carried by the flywheel; and with the stator of the magneto comprising a generating coil with a magnetic core and pole-pieces attached to the core in a novel and convenient manner; so that the flux from the magnets on the flywheel can be directed through the core of the generating coil and thus energize the latter in the proper manner.

A further object is to provide a magneto for a one-cylinder engine with suitable means for controlling the energy generated, and especially for suppressing untimely sparks that might otherwise occur in the operation thereof.

Other objects and advantages of the invention will be made clear in the following description taken with the accompanying drawings, in which a preferred form of the invention is illustrated. The disclosure, however, is explanatory only and we reserve the right to vary the structural details and to change the shape, size and arrangement of the various parts to the full extent indicated by the broad and general meanings of the terms in which the appended claims are expressed.

On the drawings:

Fig. 1 is a front elevation of the flywheel of an internal combustion engine constituting the rotor of the magneto according to this invention;

Fig. 2 is a front elevation of the stator thereof;

Fig. 3 is a section along line 3—3 of Fig. 1;

Fig. 4 is a side view seen from the left of Fig. 2;

Fig. 5 is a section on line 5—5 of Fig. 1;

Fig. 6 is a section on line 6—6 of Fig. 1;

Fig. 7 is a section along line 7—7 of Fig. 2;

Fig. 8 is a top view of the core of the generating winding joined to the pole-pieces thereof at each end;

Fig. 9 is a view of one of the outside laminations of the pole-pieces of the stator; and Fig. 10 shows inside laminations thereof.

The same numerals identify the same parts throughout.

The flywheel of an internal combustion engine is shown at 1; this flywheel including a plane web and a cylindrical rim 2. Affixed to the face of the web of the flywheel within the rim 2 are permanent magnets 3 shown as two in number; one on each side of the axis of rotation and parallel to each other. These magnets have like poles at adjacent ends and their extremities are abridged by curved pole-pieces 4 which extend along the inner surface of the rim 2. The numeral 5 indicates the stator which has the form of a round plate or disc of suitable non-magnetic metallic material; on the face of which is secured a generating coil 6 with a laminated magnetic core 7. To the extremities of this core are attached curved pole-pieces 8; the outer faces of which are circularly curved and which are spaced from the disc 5 such a distance that these polar projections can lie in the plane of these pole-pieces 4 and be enveloped by the rim 2 of the flywheel 1 when the magneto is assembled.

On the face of the disc 5, between the ends of the pole-pieces 8, is a circuit breaker or interrupter comprising a fixed or stationary contact or terminal 9 and a movable contact or terminal 10. The latter is adapted to be separated from the contact 9 by the action of a cam 11 on the hub 12 of the flywheel as the latter rotates. The interrupter controls the circuit of the primary turns of the coil 6 and when the terminals 9, 10 are separated the circuit of the primary coil is opened and the maximum induction then takes place, with the formation in the secondary turns of said coil of a high tension ignition current in the well-known manner. Associated with the interrupter is a condenser 13 secured to the same face of the disc 5 and bridged across the terminals 9 and 10.

The hub of the flywheel has projections 14 diametrically opposite each other and affixed to the web 1 of the flywheel by suitable fastening devices such as rivets or the like 15. Each of the pole-pieces 4 bridging the ends of the magnets 3 has lugs or ears 16 at one edge near the ends thereof which engage the extremities of the magnets 3, and fastening devices such as rivets or the like 17 pass through these ears and the magnets to secure the magnets and the pole-pieces firmly to the flywheel 1. On the collar 14 is also disposed a ring 18 which overlaps adjacent edges of the magnets 3 and is made fast to the collar by screws or the like 19. To the face of this ring are secured a number of arc-shaped laminations which constitute the cam 11 all affixed together to the ring 18 by suitable rivets or the like 20. These laminations may be of any suitable material such as hard fibre.

The core 7 of the generating winding 6 is preferably made up of a number of straight oblong-shaped laminations joined at their projecting ends to the pole-pieces; which consist of curved inside laminations 21, the upper ends of which have recesses 22. The ends of the laminations of the core 7 fit into these recesses and over the magnetic joint thus provided are placed the upper ends of the covering members or outer laminations 23, which are otherwise of the same shape as the laminations 21. All of the laminations of the pole-pieces 8 are attached by means of rivets 24. The upper extremities of the outer laminations 23 have tabs 26 which are bent over upon the ends of the core 7 to secure the core 7 and pole-pieces 8 tightly together. The laminations of the core 7 are indicated at 25 and are held together by rivets 27, rivets 28 pass through the pole-pieces 8 and the disc 5 so as to mount the pole-pieces and core 7 securely on the stator disc.

Between the extremities of the pole-pieces 8 remote from the coil 6 is a breaker or interrupter including the terminals 9 and 10. It comprises a mounting plate 29 resting upon one or more projections or bosses 30 carried by the disc 5 and held in place by the binding screws 31 passing through the plate 29 into threaded holes formed in the projections 30. This plate 29 has an outward extending portion or shelf 32 in which the terminal 9 is mounted and parallel with this shelf is a stud 33 which forms a fulcrum for a lever 34, bearing the movable terminal 10. The stud has a head on its outer end and the interrupter lever 34 is bent so that it can engage the side of the stud towards the shelf 32; and beyond the stud the lever is so formed that it projects into the path of the cam 11. Hence as the flywheel rotates the lever will be actuated once in each revolution to move the terminal 10 away from the terminal 9.

Normally these two terminals are held in contact by a spring 35 secured to the shelf 32 and pressing upon the lever 34 at a point near the stud 33. In practice the terminal 9 will be insulated from the shelf 32 of the metal plate 29, and the spring 35 will be held fast to the shelf 32 and prevented from electrically bridging the terminals 9 and 10 by disposing two sheets of insulation 37 on the opposite faces of the shelf 32. Over one of these sheets is a block 36 which acts as a base for the spring and this block and the sheets 37 are held fast by screws 38. These screws pass through the insulation, the block 36 and the shelf 32 and the holes in the shelf 32 being preferably of larger diameter than the screws so that the screws do not make electrical contact with the shelf. Thus the circuit through the terminals 9 and 10 is never completed except when these two terminals engage each other. To the top of the lever 34 may be affixed a retaining strip 39 which extends over the top of the stud 33, and serves to hold the lever in position on the stud. One end of this strip may have projections 40 curled over to grip a wire 41 in the form of a small conductor to serve as a grounding lead. The other end of this lead is attached to the base plate 29 of the interrupter by means of a machine screw 42.

One end of the primary coil of the winding is shown at 43 grounded upon the disc 5 and the other end is connected by a lead 44 to a binding lug 45 on the shelf 32 adjacent the contact 9. The condenser 13 is also connected to the lead 44, and the grounding switch lead 46 is connected to the same condenser terminal. The condenser is grounded through the metal casing of the condenser itself. At 47 is a high tension lead united to one terminal of the secondary coil of the winding 6, the other terminal in this secondary being disposed as will be explained later. The condenser 13 is attached to the disc 5 by means of a clip 48.

Adjacent the coil 6, the disc 5 may be provided with a concave recess or pocket 49 to receive one side of the coil and at the ends of this recess the disc has sunken portions 50 to give clearance to the conductors 43 and 44. This stator disc also has a hub 51 which may be split and provided with a screw 52 to enable it to be clamped in adjustable position on a suitable support in line with the flywheel hub 12. In the web of the flywheel I may place any opening 53 so that the terminals 9 and 10 may be inspected. And at 54 in the disc 5 are openings through which the conductors 46 and 47 may be led.

In practice the stator may be mounted on the front of an engine such as outside of the crank case, upon the hub or bearing for the projecting end of the crank shaft which carries the flywheel 1. As the flywheel rotates the flux from the magnets 3 will pass through pole pieces 8 and core 7 to energize the coil 6. At the correct point in the revolution of the flywheel the cam 11 will strike the interrupter lever 34 and separate the breaker terminals 9 and 10. A spark will thus be induced in the igniter of the engine cylinder.

The cam 11 actuates the interrupter lever 34 when the magnet pole-pieces 4 are in such position as to bridge the ends of the pole-pieces 8 adjacent the core 7 and the ends of these polepieces remote from the core 7. Such a position of the parts is indicated in Fig. 1 with the magnets approximately parallel to the line joining the axis of the hub 12 and the middle of the coil 6, the cam 11 being just about in position to engage the end of the lever 34 remote from the terminals 9 and 10. At this instant the magnetic flux is being reversed through the coil 6. When the rotor has passed through another half revolution the magnetic pole-pieces 4 again come into this position and again reverse the flux through the coil 6. When this type of magneto is connected to a four-cycle-one-cylinder engine, no spark is desired at this time but the reversal of the flux through the coil 6 might cause the secondary to deliver such a spark even if the circuit of the primary is held open at this moment by the separation of the contacts 9 and 10. To avoid an extra spark, which would be wholly undesirable at this instant, we make use of a terminal 55 attached to the inner end of the secondary of the coil 6 and projecting into proximity of a rotating contact 56 which is formed by bending up part of the edge of a curved piece of metal 57 secured to the face of the cam 11. This rotating contact 56 is about mid-way between the ends of the cam 11, and when the cam strikes the breaker lever 34 to separate the contacts 9 and 10 for sparking, this contact 56 is just opposite the terminal 55 so that the circuit of the secondary winding of the coil 6 is completed to ground at this end when the terminals 9 and 10 move asunder. The other end of the secondary coil is connected to the spark plug where a spark is then to be produced. When, however, the rotor has passed through another half turn and carries the magnets into position to reverse the flux again through the winding 6, the contact 56 will be far removed from the terminal 55 of the secondary coil; and even if a strong current be now induced in the secondary, it could produce no effect at the spark plug because the voltage will be insufficient to jump both the gap at the plug and the gap from the end of the terminal 55 to ground. At this instant the terminal 55 will in fact be located about mid-way of the open space between two ends of the cam 11. This cam may have such length that the trailing end thereof may still be in contact with the upper end of the breaker lever 34 so as to hold the contacts 9 and 10 out of engagement, but even if these two contacts were together the gap at the end of the terminal 55 would be much too long. Thus undesired sparks at incorrect intervals are completely suppressed and the only spark that takes place is given when the cam separates the terminals 9 and 10 and at the same time carries the moving contact 56 to a point opposite the electrode 55.

Having described the invention, what is claimed as new and desired to be secured and protected by Letters Patent in the United States is:

1. A magneto comprising a rotor carrying a source of magnetic flux, a stator, a generating coil on the stator, a circuit breaker for said coil operated by the rotor, and means comprising a fixed and a movable terminal to prevent said coil from delivering ignition current except at the desired instant.

2. A magneto comprising a rotor with a source of magnetic flux thereon, a stator having a generating coil, pole-pieces associated with said source and said coil and disposed to enable the magnetic flux to be reversed through the coil twice for every revolution of the rotor and means comprising terminals associated with the coil to permit the latter to deliver sparking current in conjunction with only one reversal of the magnetic flux through said coil.

3. A magneto comprising a source of magnetic flux, a generating coil, means for mounting said coil and said source so that they are relatively movable, a circuit breaker for said coil to be operated at a predetermined instant and terminals for enabling the coil to deliver current at the same instant and to prevent operation thereof at any other instant.

4. A magneto comprising a source of magnetic flux, a generating coil, means for mounting said coil and said source so that they are relatively movable, a circuit breaker for said coil to be operated at a predetermined instant and terminals for enabling the coil to deliver current at the same instant and to prevent operation thereof at any other instant, one of said terminals being incorporated in said coil.

5. A magneto comprising a source of magnetic flux, a generating coil, said coil and said source being mounted so that one may revolve with respect to the other, the coil and said source having pole-pieces disposed so that the flux is reversed through the coil twice per revolution, and means comprising fixed and movable terminals, one of which is embedded in said coil, for permitting the coil to deliver sparking current only during every other reversal of the flux through the coil.

6. A magneto comprising a rotor and a stator, one of said parts carrying a source of magnetic flux and the other a generating coil, the source and the coil having pole-pieces disposed so that the flux is reversed through the coil twice per revolution, a circuit breaker for said coil and a pair of terminals, one of which is stationary with respect to the coil and connected thereto, and the other movable and cooperating to enable the coil to deliver ignition current at only one reversal of the flux therethrough for each revolution of the magneto.

7. A magneto comprising a rotor in the form of a flywheel having a rim, straight parallel magnets secured to the flywheel, curved pole-pieces joining the ends of said magnets, the flywheel having a hub thereon between said magnets, a stator having a generating coil thereon with pole-pieces on each end to cooperate with the magnet pole-pieces, a circuit breaker on the stator to control the generating coil and a cam on the hub of the flywheel to actuate the circuit breaker.

8. A magneto comprising a stator having a generating winding, a core passing through said winding, pole-pieces connected to the ends of the core and secured to the stator, and covering members for the sides of the pole-pieces having means for engaging and gripping the ends of the core.

9. A magneto comprising a rotating source of magnetic flux, a stator having a generating winding thereon, a magnetic core in said winding, pole-pieces at the ends of the core affixed to the stator and covering members for the pole-pieces, said members having flexible projections to grip the ends of the core and attach the pole-pieces thereto.

10. A magneto comprising a rotating source of magnetic flux, a stator carrying a generating winding and a circuit breaker for said winding, said circuit breaker comprising a plate attached to the stator with an outward projecting shelf, a fixed contact on said shelf, a stud on the shelf parallel with the plate, a lever engaging one side of said stud and bearing a contact to cooperate with a fixed contact, and a spring attached at one end to the shelf and engaging the breaker lever, so as to cause said contacts to engage each other.

In testimony whereof we affix our signatures.

LOUIS BEEH.
WOLFGANG E. SCHWARZMANN.